(12) United States Patent
Zhang et al.

(10) Patent No.: US 7,685,088 B2
(45) Date of Patent: Mar. 23, 2010

(54) SYSTEM AND METHOD FOR GENERATING NEW CONCEPTS BASED ON EXISTING ONTOLOGIES

(75) Inventors: Zhuo Zhang, Beijing (CN); Zhao Ming Qiu, Beijing (CN); Shixia Liu, Beijing (CN); Yue Pan, Beijing (CN); Guo Tong Xie, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 748 days.

(21) Appl. No.: 11/447,546

(22) Filed: Jun. 5, 2006

(65) Prior Publication Data

US 2008/0301083 A1 Dec. 4, 2008

(30) Foreign Application Priority Data

Jun. 9, 2005 (CN) ............ 2005 1 0077807

(51) Int. Cl.
*G06N 5/04* (2006.01)
*G06F 15/18* (2006.01)

(52) U.S. Cl. ............................................. 706/61
(58) Field of Classification Search ............. None
See application file for complete search history.

(56) References Cited

U.S. PATENT DOCUMENTS

| 5,511,037 | A * | 4/1996 | Randall et al. ............ 367/33 |
| 2004/0083199 | A1 * | 4/2004 | Govindugari et al. ........ 707/1 |
| 2004/0230636 | A1 * | 11/2004 | Masuoka et al. ............ 708/800 |

OTHER PUBLICATIONS

'Generating titles for paragraphs using statistically extracted keywords and phrases': Gokcay, 1995, IEEE, 0-7803-2559-1, pp. 3174-3179.*
'On syntactical and semantical approaches to similarity based approximate reasoning': Esteva, 2001, IEEE 0-7803-7078-3 pp. 1598-1603.*
'Using ontology in hierarchical information clustering': Breaux, Jan. 2005, IEEE 0-7695-2268-8.*

* cited by examiner

*Primary Examiner*—David R Vincent
*Assistant Examiner*—Peter Coughlan
(74) *Attorney, Agent, or Firm*—Leonard T. Guzman

(57) ABSTRACT

A system and a method for automatically generating new concepts based on existing ontologies are provided. The system creates new concepts in existing ontologies based on new concept descriptions expressed in a natural language format, and comprises: a normalizer for receiving and parsing the new concept descriptions so as to transform them into normalized one and output them, wherein said normalized concept description includes one or more description part(s) having kernel concepts, said description parts can only contain the terms which can be identified in said existing ontologies, and each of said kernel concept contains a headword and zero or more property(s); and a new concept factory for, based on the normalized description of the new concept, identifying the kernel concepts in each normalized concept description part, and extracting the identified kernel concepts, related properties, and the relations among the kernel concepts for a user to create new concepts according to existing ontologies. Therefore, ontologies will be easier to be managed, reused and expanded, while keeping smaller size and less complexity of the ontologies.

22 Claims, 6 Drawing Sheets

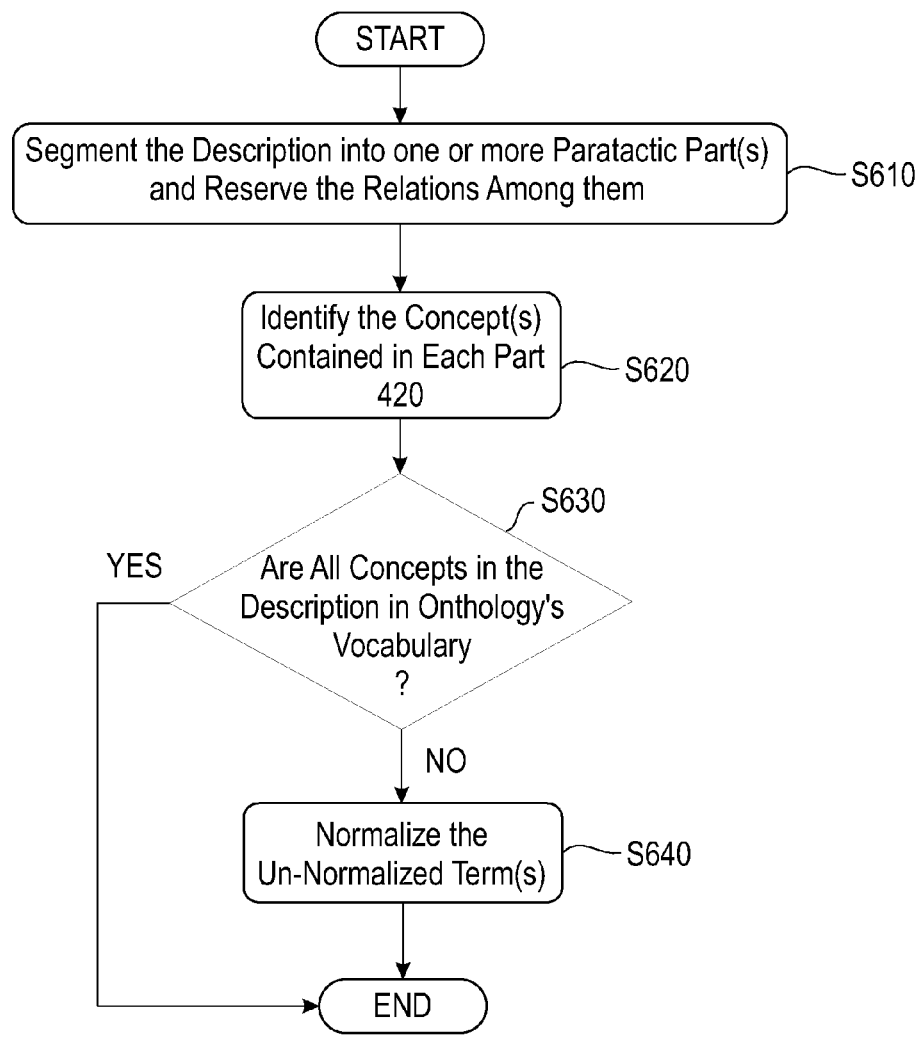

SYSTEM AND METHOD FOR GENERATING NEW CONCEPTS BASED ON EXISTING ONTOLOGIES

TECHNICAL FIELD

The present invention generally relates to a system and a method for processing a description which is expressed in the form of natural language. More particularly, the present invention relates to a system and a method for creating a new concept in an existing ontology based on a new concept description expressed in the form of natural language format.

BACKGROUND ART

Ontology is the term referring to shared understanding of some domains of interest, which is often conceived as a set of classes (concepts), relations, functions, axioms and instances. By providing a clear and formal description, ontology can greatly assist users as well as applications in understanding common domain knowledge. It is viewed as the backbone in knowledge management (KM) area.

During the last decade, a considerable amount of ontologies has been built. Most of these ontologies are composed of general concepts for certain domains. However, in real applications, more detailed concepts are often needed in concrete application scenarios. These detailed concepts are more concrete concepts for a certain application, which we call new concepts. Their characteristics are described in the form of natural language, and can be represented with concepts in existing ontologies. Usually, creating these detailed concepts can only be performed manually. Those who want to create these new concepts have to go through the whole ontology carefully, identify the relationships between new concepts and existing concepts in ontology. The whole process is labor-intensive and error prone. Above all, it is a challenging task to create these new concepts efficiently.

SUMMARY OF INVENTION

Therefore, an object of the present invention is to provide a system and a method for automatically generating new concepts based on existing ontologies. The system will bring great improvement to the reuse of existing ontologies. The system not only increases the efficiency of creating new concepts, but also brings significant benefits to ontology related applications.

In order to achieve the above and other objects of the present invention, a system for creating new concepts in existing ontologies based on new concept descriptions expressed in the form of natural language is provided, comprising: a normalizer for receiving and parsing the new concept descriptions so as to transform them into normalized ones and output them, wherein said normalized concept description includes one or more description part(s) having kernel concepts, said description parts can only contain the terms which can be identified in said existing ontologies, and each of said kernel concepts contains a headword and zero or more property(s); and a new concept factory for, based on the normalized description of the new concept, identifying the kernel concepts in each normalized concept description part, and extracting the identified kernel concepts, related properties, and the relations among the kernel concepts for a user to create new concepts according to existing ontologies.

In order to achieve the above and other objects of the present invention, a method for creating new concepts in existing ontologies based on new concept descriptions expressed in the form of natural language is provided, comprising the steps of: identifying whether the received new concept description has a normalized format, and if the received new concept description does not have a normalized format, transforming the new concept description of the un-normalized format into a normalized description, wherein said normalized concept description includes one or more description part(s) having kernel concepts, said description parts can only contain the terms which can be identified in said existing ontology, and said kernel concepts each contain a headword and zero or more property(s); and identifying the kernel concepts in each normalized concept description part, and extracting the identified kernel concepts, related properties, and the relations among the kernel concepts, thereby generating an expression of the new concept based on existing ontologies.

In order to achieve the above and other objects of the present invention, there is provided a program product for storing computer program codes in a computer readable form thereon so that a computer system executes the computer program codes to realize the steps of: identifying whether the received new concept description has a normalized format, and if the received new concept description does not have a normalized format, transforming the new concept description of the un-normalized format into a normalized description, wherein said normalized concept description includes one or more description part(s) having kernel concepts, said description parts can only contain the terms able to be identified in said existing ontology, and said kernel concepts each contain a headword and zero or more property(s); and identifying the kernel concepts in each normalized concept description part, and extracting the identified kernel concepts, related properties, and the relations among the kernel concepts, thereby generating an expression of the new concept based on existing ontologies.

The present invention is involved in dynamically generating new concepts in terms of existing ontologies based on the new concept description expressed in the form of natural language format. By using the above method and system according to the present invention, the ontologies in a certain domain can be managed very easily and meanwhile the small size and low complexity of the ontologies can be maintained.

BRIEF DESCRIPTION OF THE DRAWINGS

Those skilled in the art can understand the present invention better and can understand many objectives, properties and advantages of the present invention by referring to drawings. In the drawings, similar or identical parts are indicated by identical reference numerals throughout, and in the drawings:

FIG. 5 is a block diagram showing a new concept expression generator shown in FIG. 3 according to an embodiment of the present invention;

FIG. 6 is a flowchart showing transforming an un-normalized concept description into a normalized concept description;

DETAILED DESCRIPTION OF THE INVENTION

An embodiment of the present invention will be described in detail hereinafter. It should be noted that the following description should not be used to limit the present invention. On the contrary, according to the inventive idea of the present invention, those ordinary skilled in the art can make proper alternations which fall into the invention scope defined by the appended claims.

Figure 1:
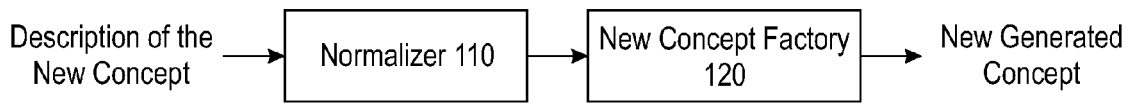
FIG. 1 is a block diagram showing a system for automatically or semi-automatically creating a new concept based on the description of the new concept according to an embodiment of the present invention.

FIG. 1 is a block diagram showing a system for automatically or semi-automatically creating a new concept based on the description of the new concept according to an embodiment of the present invention. Referring to FIG. 1, the system for automatically or semi-automatically creating a new concept comprises a normalizer 110 and a new concept factory 120.

The normalizer 110 is used to receive and parse a new concept description expressed in the form of natural language so as to transform it into a normalized concept description and output it. The normalized concept description includes one or more description part(s) each containing a headword and zero or more property(s), wherein said description parts can only be the terms which can be identified in the existing ontologies. In the case that there exist many description parts, the relations among the description parts can be logic relations such as AND/OR/NOT.

It should be noted that the property is a binary/multi relation among the individuals represented by headwords, that is, the property connects two individuals together. For example, property "brother" may connect two individuals A and B together, while property "height" can connect A and "108 cm" together. A property can have an inverted property. For example, the inverted property of a father is a son. A property can be limited to only having one value, i.e. so-called functional property. The property can further have transitivity or be symmetric. In different occasions, a property is also referred to as a slot, a role, a relation or an attribute, etc.

The new concept factory 120 is used to generate an expression for a new concept based on a normalized new concept description according to existing ontologies. According to the generated expression, users can create the new concept by using a new concept description in the form of natural language.

Herein, the new concept is a more concrete concept for a certain application, the concept description is the description about the properties of a certain concept in the form of natural language (NL), and the existing ontologies are the ontologies having been created for many domains, in which the basic concepts of corresponding domains and the properties of these basic concepts were described in ontology syntax. An example of the natural language description is "materials of borrowers who are played by a natural person".

Figure 2:
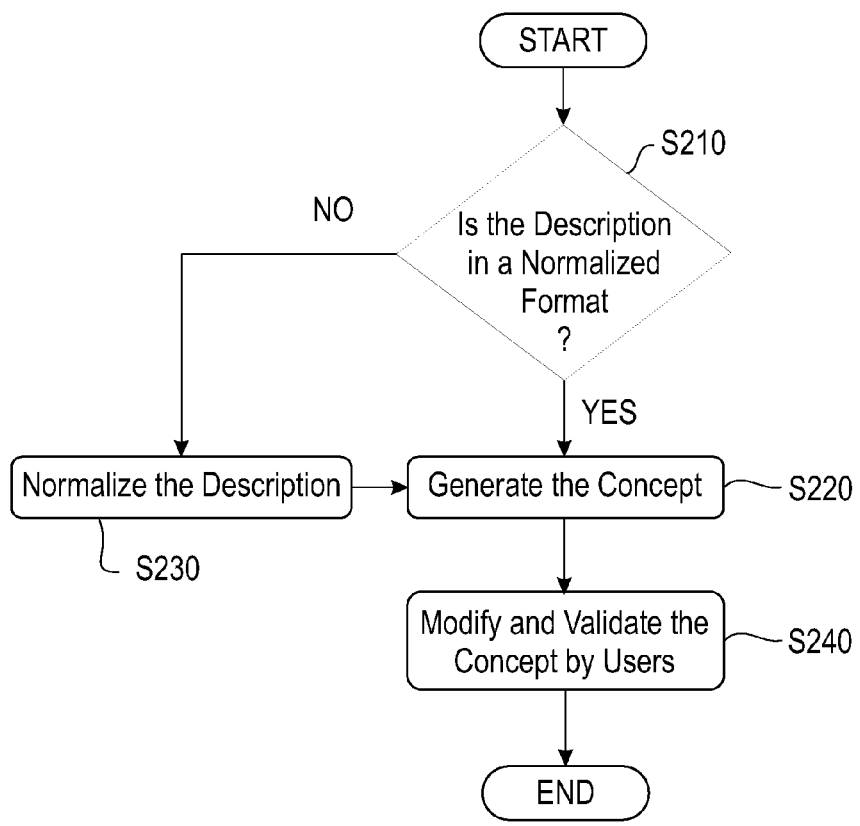
FIG. 2 is a flowchart showing a method for automatically or semi-automatically creating a new concept according to an embodiment of the present invention.

FIG. 2 is a flowchart showing a method for automatically or semi-automatically creating a new concept according to an embodiment of the present invention. Referring to FIG. 2, at step S210, the normalizer 110 identifies whether a received new concept description expressed in a natural language format has a normalized format. If it is identified that the new concept description has a normalized format at step S210, the process proceeds to step S220, where the new concept factory 120 generates an expression for the new concept 120 based on existing ontologies.

There are several ways to generate a formalized expression for a new concept at step S220: creating a new concept by imposing constraints on the range of the basic concept of an existing ontology; and performing intersection/union/complement operations on the basic concept of the existing ontologies with/without property restrictions to create a new concept. The latter way to create a new concept can be represented as the "AND", "OR" and "NOT" logic operations for the basic concept of the existing ontologies with/without property restrictions.

If it is identified at step 210 that the received new concept description is not in a normalized format, the process proceeds to step S230, where the normalizer 110 transforms the new concept description in un-normalized format into a normalized description, and extracts kernel concepts, related properties, and the relations among the kernel concepts. The so-called kernel concepts each contain a headword and zero or more property(s). The normalization is to segment an un-normalized concept description into one or more description part(s) each with a headword and zero or more property(s), and reserve the relations among them, the relations being logic relations such as AND/OR/NOT. Herein, as mentioned above, a normalized description includes one or more description part(s) in which the sub-phrase(s) (i.e., the description part(s)) can only be terms that can be identified in existing ontologies.

Next, the process proceeds to the above mentioned step S220 so as to utilize the normalized new concept descriptions and the corresponding kernel concepts to create new concepts based on existing ontologies.

Next, the process also executes step S240 to validate the generated new concepts and modify the generated new concepts that are unable to pass the validation by using the new concept factory 120 based on the validated result, wherein the modification can be made by those skilled in the art based on the existing ontologies. Then the process terminates.

It is worth noting that not all of the steps described here are compulsory in a real implementation. For example, after extracting kernel concept(s), related properties, and the relations among the kernel concepts, users can skip the automatic concept generation operation step S220 and directly create the new concept. It should be noted that those ordinary skilled in the art should be able to write directly an expression corresponding to the new concept based on the normalized result. For example, if such a result as "man who is older than 30" after normalization, then the user himself can write directly such an expression as

```
"<owl:Class>
    <owl:unionOf rdf:parseType="Collection"/>
...".
```

Figures 3, 4:
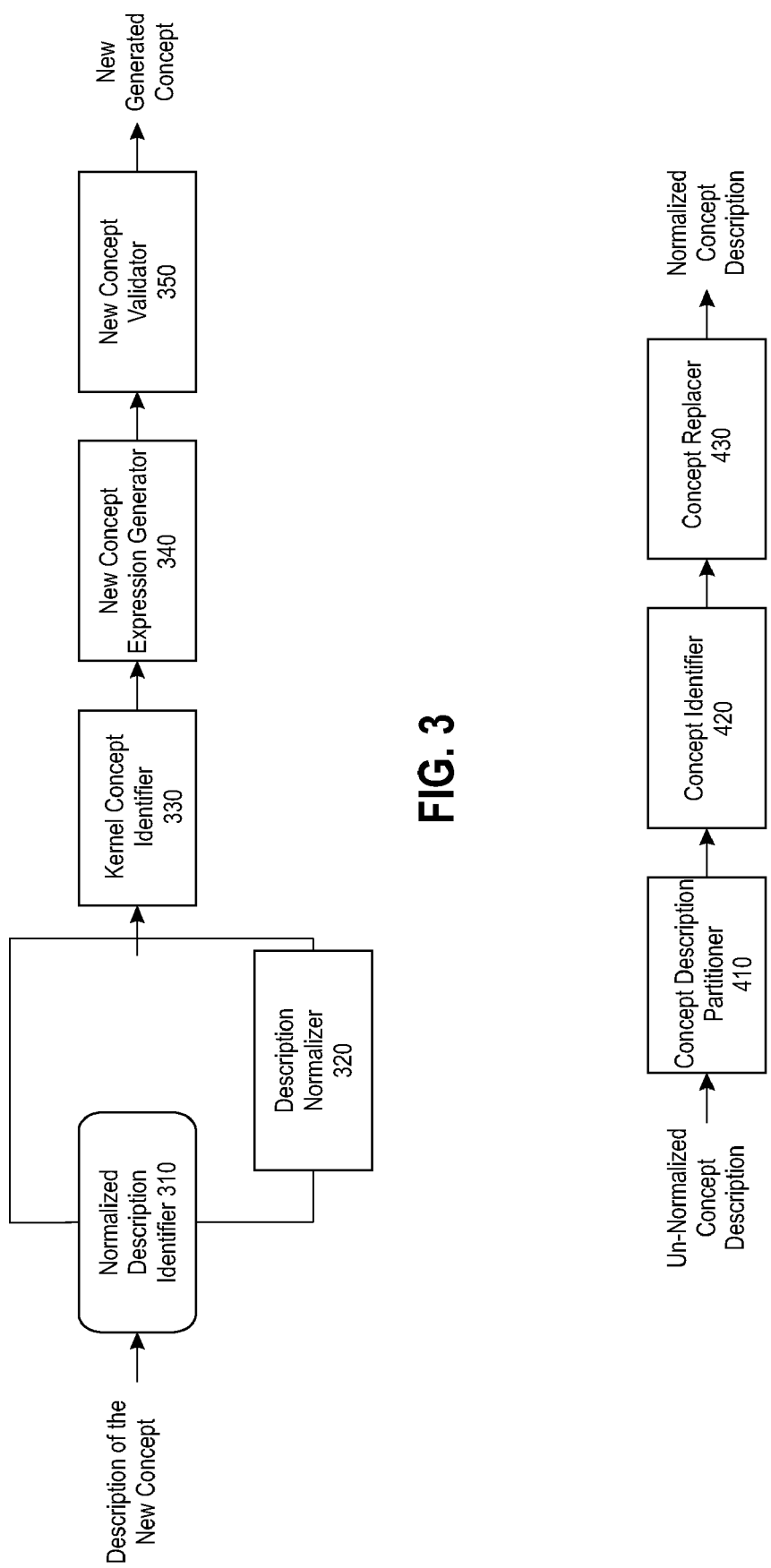
FIG. 3 is a block diagram showing in detail a system for automatically or semi-automatically creating a new concept based on the description of the new concept according to an embodiment of the present invention.
FIG. 4 is a block diagram showing a normalizer shown in FIG. 3 according to an embodiment of the present invention.

FIG. 3 is a block diagram showing in detail a system for automatically or semi-automatically creating a new concept based on the description of the new concept according to an embodiment of the present invention. Referring to FIG. 3, the system for creating new concepts according to the embodiment comprises a normalized description identifier 310, a description normalizer 320, a kernel concept identifier 330, a new concept expression generator 340, and a new concept validator 350.

The normalized description identifier 310 is used to receive a description about a new concept, identify whether the new concept description is a normalized concept description and directly output the concept description if identified as a normalized one.

The description normalizer 320 connected with the normalized description identifier 310 is used to parse the concept description which is identified as un-normalized concept description by the normalized description identifier 310, transform the un-normalized concept description into a normalized one, and then output the transformed normalized concept description. Here, as mentioned above, the new concept description is in the form of natural language. In addition, the normalized concept description contains one or more description part(s), and the relations among them can be logic relations such as AND/OR/NOT. Generally, in each description part there will be a headword, zero or more property(s).

FIG. 4 is a block diagram showing the description normalizer 320 shown in FIG. 3 according to an embodiment of the present invention. Referring to FIG. 4, the description normalizer 320 shown in FIG. 3 comprises a concept description partitioner 410, a concept identifier 420, and a concept replacer 430. The concept description partitioner 410 is used to segment a received un-normalized concept description into one or more description part(s), in which the relations among the description parts can be logic relations such as AND/OR/NOT. Generally, in each description part there will be a headword, zero or more property(s). The concept identifier 420 connected with the concept description partitioner 410 is used to, for each segmented description part, identify the concept(s), such as classes and properties, in it. The concept replacer 430 connected with concept identifier 420 is used to, if the identified kernel concepts (names) are not in a normalized format, replace them with their corresponding normalized ones in ontology, wherein the replacement is executed based on a domain synonym set and sentence similarity algorithm. Thus through the processing of the description normalizer 320, the original un-normalized concept description will be transformed into a normalized one.

It is worthy of noting that the concept identifier 420 has an identical structure and function as that of the kernel concept identifier 330 described below.

FIG. 5 is a block diagram showing the new concept expression generator 340 shown in FIG. 3 according to an embodiment of the present invention. Referring to FIG. 5, the new concept expression generator 340 comprises a shortest path generator 510, a language expression generator 520 and a combined expression generator 530.

Hereinafter, it is assumed that the description parts in a new concept description are $Part_1, \ldots, Part_n$ (n>=1), the headword in each description part are $H_1, \ldots, H_n$, the concepts and properties in each description part $Part_i$ are $C_{i1}, \ldots, C_{im}$ (m>=0) and $Pro_{i1}, \ldots, Pro_{iw}$ (w>=0), respectively, where m=0 means no other concept, and w=0 means no property in a corresponding part.

Under the above mentioned assumption, the shortest path generator 510 in the new concept expression generator 340 finds, for each $C_{ij}$ (1<=j<=m), the shortest path $Path_{ij}$ from Hi to $C_{ij}$, and the path should satisfy the following requirements:
a) if w>0, it contains some $Pro_{it}$ (1<=t<=w)
b) it contains no cycle,
a) for any node $N_i$ in the path, if $N_i$ is a class, it is followed by edge $E_j$; if $E_j$ is a property, the destination must be a class or an instance; and if $E_j$ is a superClassOf relation (for example, "person" is the super class of "man", the relation between "person" and "man" is a superClassOf relation, similar relation correlation are e. g. (animal, vertebrate), (student, senior high school student), (company, IT company) and etc.), the destination must be a class.

The language expression generator 520 receives the output of the shortest path generator 510, and generates a corresponding expression $E_{ij}$ in a certain language by using $Path_{ij}$ generated by the shortest path generator. The language is for example OWL (web ontology language) or Description Logic. The method is not limited to the above two kinds of languages.

Then, the combined expression generator 530 receives all the expressions $E_{ij}$ in each $Part_i$ generated by the language expression generator 520, and combines all expressions $E_{ij}$ (j is from 1 to m) in each $Part_i$ with corresponding relationships to one expression $CE_i$ based on relations (AND/OR/NOT) among $C_{ij}$ (the default one is AND).

Specifically, when generating the combined expression $CE_i$, the combined expression generator 530 first judges whether the number of the description parts is greater than 1. If it is judged that the number of the description parts is greater than 1, then based on relations (AND/OR/NOT) among $Part_i$ (the default one is AND), the combined expression generator 530 combines expression $CE_i$ (1<=i<=n) and generates a final concept expression. Otherwise, if the combined expression generator 530 judges that the number of the description parts is equal to 1, then $CE_i$ is taken as the final concept expression.

FIG. 6 is a flowchart showing transforming an un-normalized concept description into a normalized concept description. Referring to FIG. 6, in the process of describing normalized and un-normalized concepts, at step S610, the concept description partitioner 410 in the description normalizer 320 segments an un-normalized concept description into one or more description part(s) each containing a headword, zero or more property(s), and reserves the relations among the description parts. The relations can be logic relations such as AND/OR/NOT.

At step S620, the concept identifier 420 in the description normalizer 320 identifies, for each segmented description part, the concept(s), such as classes and properties, in it.

Next, at step S630, it is judged that whether the identified kernel concepts are in a normalized format. If it is judged that the identified concepts at step S630 are not in a normalized format, the process proceeds to step S640, where the kernel concepts are replaced with their corresponding normalized ones in existing ontologies, based on a synonym set in the domain which the ontologies is created for, and sentence similarity algorithm. Then the process terminates.

If it is judged that the identified concepts are in a normalized format at step S630, then the process terminates immediately.

The above process will be described by taking an example. Consider the description "documents which are held by natural person and legal person". This description only contains one description part. With respect to an ontology containing the concepts "Document" and "Natural Person" and a corresponding synonym set containing the synonym pair "Document←→material", its normalized format is "[documents which are held by natural person AND legal person]".

As to the description "credit loan or mortgage loan", it will be divided into two description parts: "credit loan" and "mortgage loan". The relation between then is "OR". Its normalized format is "[credit loan] OR [mortgage loan]".

Referring back to FIG. 3, the new concept description output from normalized description identifier 310 and description normalizer 320 is in a normalized format. The normalized new concept description is inputted into the kernel concept identifier 330. The kernel concept identifier 330 identifies the kernel concepts in each normalized concept description part, and extracts the identified kernel concepts, the related properties, and the relations among the kernel concepts. There are two ways for kernel concept identifier 330 to identify kernel concepts. One way is to use headword identifying methods used in the field of natural language processing. For example, for the above description "documents which are held by natural person and legal person", we can find out that "Document" is a headword in this phrase with the help of existing algorithms (referring to EP 1217533: Method and computer system for part-of-speech tagging of incomplete sentences. Inventor(s): TARBOURIECH NELLY (FR); POIRIER HERVE (FR); and referring to Williams, Geoffrey. (2002) 'Corpus-driven lexicography and the specialized dictionary: headword extraction for the parasitic plant research dictionary', in Anna Braasch and Claus Povlsen (eds.) Proceedings of the Tenth EURALEX International Congress, EURALEX 2002, Copenhagen: Center for Sprogteknologi, II, 859-864). That means "Document" is the kernel concept in this description.

Another way is to analyze the concepts present in the description based on an existing ontology. The ontology can be viewed as a directed graph G, where concepts are nodes and relationships between them are directed edges. Given n concepts, let $c_i$ denote the i-th concept. Let $d(c_i, c_j)$ be the distance between the i-th concept $c_i$ and the j-th concept $c_j$ in the directed graph G, $s(node_i)$ be the total number of the related concepts that the i-th concept $c_i$ can reach in the directed graph G. For each concept $c_i$ existed in the description, we can determine its importance in the description part it belongs to by the following two factors:

1) $s(c_i)$: The number of the concepts the concept $c_i$ can reach in the description part. A more important concept can reach more concepts;

2)

$$\sum_{j=1}^{n, j \neq i} d(c_i, c_j):$$

The sum of distances between the concept $c_i$ and all other concepts in the concept description. A more important concept will have a smaller distance summation.

The importance of the concept $c_i$, named $D_i$ can be calculated by formula:

$$D_i \stackrel{def}{=} \frac{s(c_i)}{\sum_{j=1}^{n, j \neq i} d(c_i, c_j)}$$

The kernel concept $c_k$ in the description is the concept with maximum importance value wherein k can be represented by the following formula:

$$(1 \leq k \leq n)^{\wedge}(D_k = Max(D_{i|i=1, n})).$$

The kernel concept identifier 330 can find out the kernel concept by using this formula.

For example, for the concept description part "[documents which are held by natural person AND legal person]", $D_{document}=1$, $D_{natural\ person}=0$ and $D_{legal\ person}=0$ can be computed. Obviously, $D_{document}$ is the maximum therein, so concept "document" is the kernel concept therein.

Referring to FIG. 3 again, after the kernel concept identifier 330 extracts the kernel concepts, related properties, and the relations among the kernel concepts, the new concept expression generator 340 can automatically generate a new concept.

Figure 7:
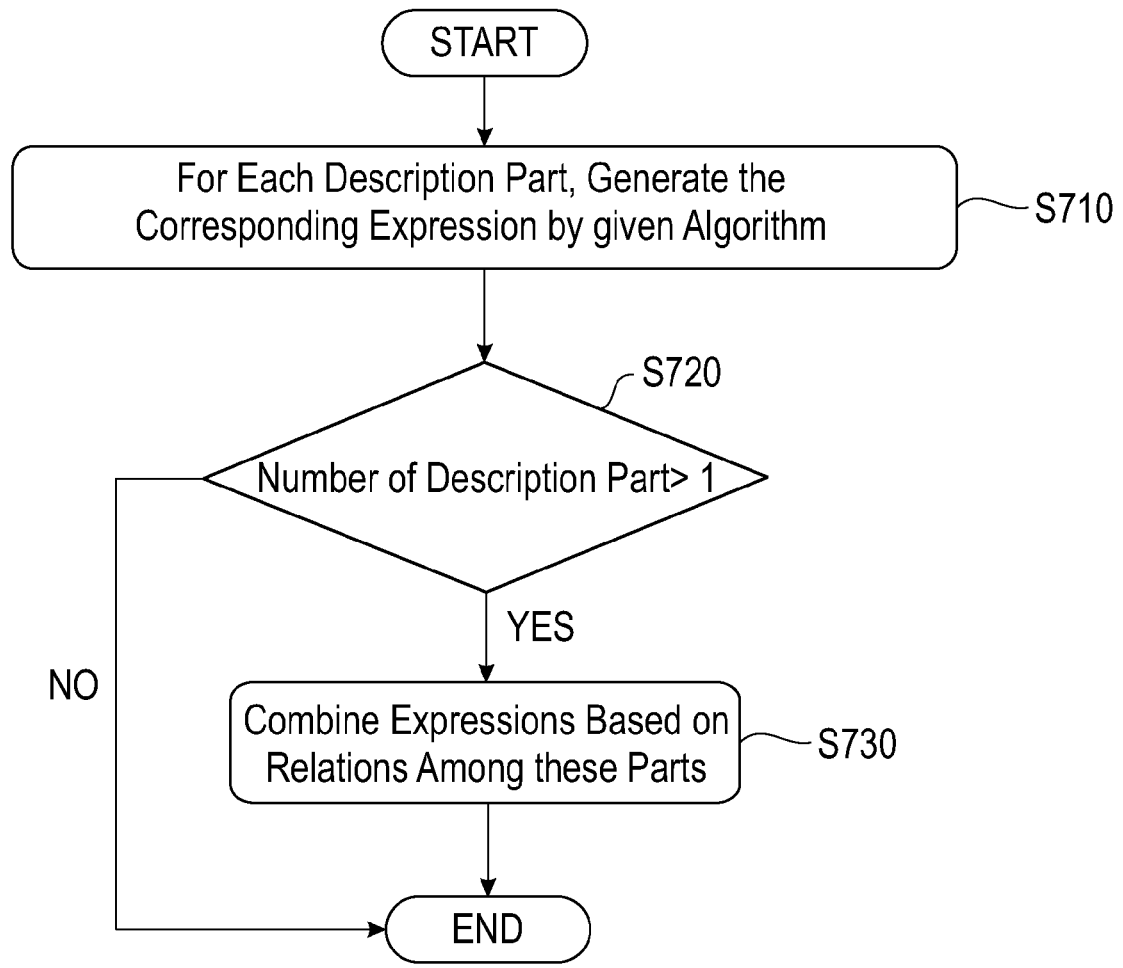
FIG. 7 is a flowchart showing an algorithm for generating a new concept according to an embodiment of the present invention.

FIG. 7 is a flowchart showing an algorithm which can be used by the new concept expression generator 340 shown in FIG. 3 to generate a new concept according to an embodiment of the present invention. By imposing property restrictions on the kernel concepts identified by the kernel concept identifier 330 and performing intersection/union/complement operations on them, the new concept expression generator 340 generates a new concept expression.

The algorithm for the new concept expression generator 340 to generate a new concept is as follows:

As mentioned above, it is given that the description parts in a new concept description are $Part_1, \ldots, Part_n (n \geq 1)$, the headwords in each part are $H_1, \ldots, H_n$, concepts and properties in each part $Part_i$ are $C_{i1}, \ldots, C_{im} (m \geq 0)$ and $Pro_{i1}, \ldots, Pro_{iw} (w \geq 0)$, respectively (m=0 means no other concept and w=0 means no property in corresponding part).

At step S710, the new concept expression generator 340 first find, for each $C_{ij}$ ($1 \leq j \leq m$), the shortest path $Path_{ij}$ from $H_i$ to $C_{ij}$, the path should satisfy the following requirements:
a) if w>0, it contains some $Pro_{it}$ ($1 \leq t \leq w$),
b) it contains no cycle,
c) for any node $N_i$ in the path, if $N_i$ is a class and it is followed by edge $E_j$, if $E_j$ is a property, the destination must be a class or an instance, and if $E_j$ is a supperClassOf relation, the destination must be a class;
then with $Path_{ij}$, generate the corresponding expression $E_{ij}$ in a certain language, such as OWL or Description Logic.

Then, based on relations (AND/OR/NOT) among $C_{ij}$ (the default one is AND), the process combines all expressions $E_{ij}$ (j is from 1 to m) in each $Part_i$ with corresponding relationships to one expression: $CE_i$. Specifically, the process proceeds to step S720, where it is judged whether the number of the description parts is greater than 1.

If it is determined at step S720 that the number of the description parts is greater than 1, the process proceeds to step S730, where the new concept expression generator 340 combines expressions $CE_i$ ($1 \leq i \leq n$) to generate a final concept expression based on the relation between $Part_i$ (AND/OR/NOT) (the default one is AND). Then the process terminates.

If it is determined at step S720 that the number of the description parts is equal to 1, then the new concept expression generator 340 takes $CE_i$ as the final concept expression. Then the process terminates.

Usually, OWL can support all the expressions of these types. For example, the "documents of borrowers who are played by natural person or legal person" can be represented by OWL as:

```
<owl:Class >
    <rdfs:subClassOf rdf:about="# Document" />
    <rdfs:subClassOf>
            <owl:unionOf rdf:parseType="Collection" />
            <owl:Restriction>
                <owl:onProperty rdf:resource="#Playedby" />
                <owl:allValuesFrom
                    rdf:resource="NaturalPerson" />
            </owl:Restriction>
```

-continued

```
        <owl:Restriction>
            <owl:onProperty rdf:resource="#Playedby" />
            <owl:allValuesFrom rdf:resource="LegalPerson" />
        </owl:Restriction>
    </owl:unionOf>
</rfds:subClassOf>
</owl:Class>
```

The description "credit loan or mortgage loan" can be represented by OWL as:

```
<owl:Class>
    <owl:unionOf rdf:parseType="Collection" />
        <owl:class rdf:about="#CreditLoan">
            <owl:class rdf:about="#MortgageLoan">
    </owl:unionOf>
</owl:Class>
```

Next, referring to FIG. 3 again, the new concept validator 350 validates whether the new concept generated by the new concept expression generator 340 is the required new concept indeed, and may modify the generated new concept when necessary. Finally, users obtain a new class based on the output of the new concept validator 350. Obviously, the class obtained here is expressed in a form of new class.

Hereinafter, a specific application scenario is provided to describe how to envision the method of the present invention. The main idea for this specific application scenario is to automatically select existing instances according to user's description for a certain application.

EXAMPLE 1

Union of Existing Classes with Property Restrictions

Figure 8:
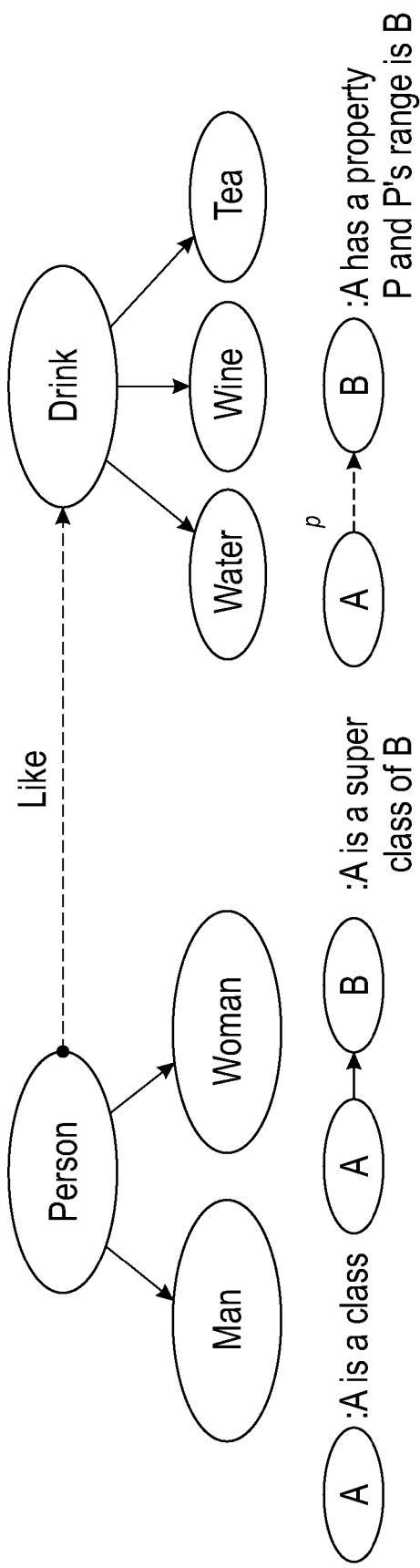
FIG. 8 shows an example of an ontology in certain domain expressed in a directed graph.

FIG. 8 shows an example of a ontology in a certain domain expressed in a directed graph. Referring to FIG. 8, in this specific application scenario, the main steps for automatically selecting existing instances are as follows:

1) Describe the Restrictions of the Instances by a User

For example, if the user wants to get all existing males who like wine and females who like tea, he can give the description like "male who likes wine and female who likes tea".

2) Normalize

After normalization, the description will be "[man who likes wine] AND [woman who likes tea]".

3) Identify Headword

For the above example, the headwords are "man" for [man who likes wine] as well as "woman" for [woman who likes tea].

4) Generate the New Class

With the normalized description and its headword, the system of the present invention can generate the new class as follows:

```
<owl:Class>
    <owl:unionOf rdf:parseType="Collection" />
        <owl:Class >
        <rdfs:subClassOf rdf:about="# man" />
        <rdfs:subClassOf>
            <owl:Restriction>
                <owl:onProperty rdf:resource="# like" />
                <owl:allValuesFrom rdf:resource="#wine"/>
            </owl:Restriction>
        </rdfs:subClassOf>
        </owl:Class>
        <owl:Class >
        <rdfs:subClassOf rdf:about="# woman" />
        <rdfs:subClassOf>
            <owl:Restriction>
                <owl:onProperty rdf:resource="# like" />
                <owl:allValuesFrom rdf:resource="# tea"/>
            </owl:Restriction>
        </rdfs:subClassOf>
        </owl:Class>
    </owl:unionOf>
</owl:Class>
```

Here, we represent the new class in OWL format. Then the user is required to check the expression and validate whether the new class is exactly what he wants.

5) Get the Instances.

With the new class, the system of the present invention can check existing instances and select those conforming to the new class' definition. The selection result is those who conform to the description "male who likes wine and female who likes tea".

EXAMPLE 2

Property Restriction

Figure 9:
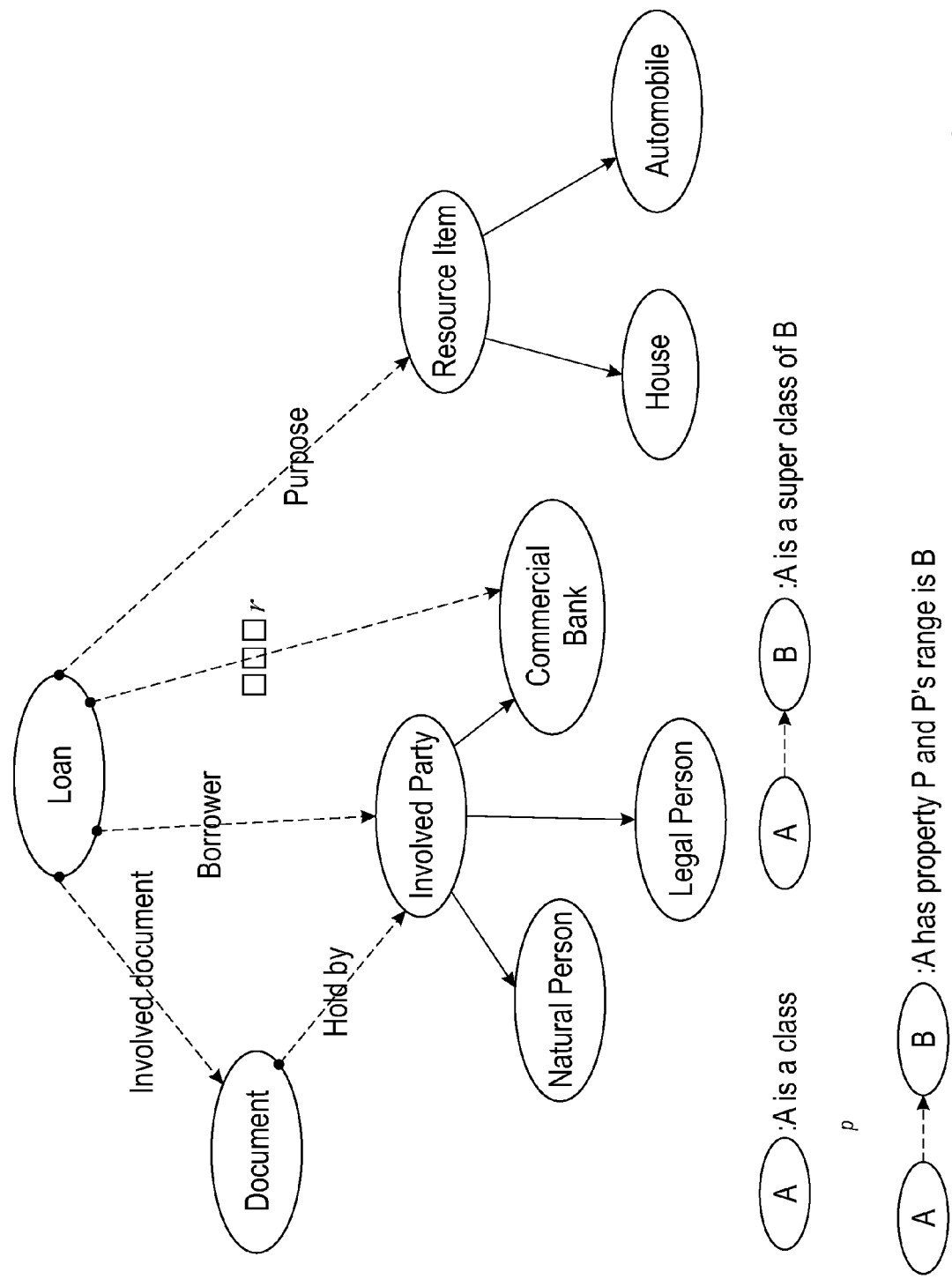
FIG. 9 shows another example of an ontology in certain domain expressed in a directed graph.

FIG. 9 shows another example of an ontology in a certain domain expressed in a directed graph. Referring to FIG. 9, in this specific application scenario, the main steps to automatically select existing instances are as follows:

1) Describe the Restrictions of the Instances by a User

For example, if the user wants to get all existing loans whose borrowers is played by natural person and whose purpose is to buy a car or a house, then he can give the description like "loan that its borrower is a natural person and its purpose is to buy car or house".

2) Normalize

After normalization, the description will be "[loan that its borrower is a natural person and its purpose is to by automobile or house]".

3) Identify Headword

For the above example, the headword is "loan".

4) Generate the New Class

With the normalized description and its headword, the system can generate the new class as follows:

```
<owl:Class >
    <rdfs:subClassOf rdf:about="# Loan" />
    <rdfs:subClassOf>
        <owl:Restriction>
            <owl:onProperty rdf:resource="# borrower" />
            <owl:allValuesFrom rdf:resource="#NaturalPerson"/>
        </owl:Restriction>
    </rdfs:subClassOf>
    <rdfs:subClassOf>
        <owl: Restriction>
            <owl:onProperty rdf:resource="#purpose" />
            <owl:allValuesFrom>
                <owl:Class>
                    <owl:unionOf rdf:parseType="Collection" />
                        <owl:class rdf:about="#Automobile">
                        <owl:class rdf:about="#House">
                    </owl:unionOf>
```

```
            </owl:Class>
          <owl:allValuesFrom>
        </owl:Restriction>
    </rdfs:subClassOf>
</owl:Class>
```

Here, we represent the new class in OWL format. Then the user is required to check the expression and validate whether the new class is exactly what he wants.

5) Get the Instances

With the new class, the system of the present invention can check existing instances and select those conforming to the new class' definition. The selection result is those who conform to the description "loan whose borrower is a natural person and its purpose is to buy a car or a house".

With existing methods, users have to manually construct a set of complex query sentences to get the required instances, while with our method, users can get the required instances only by providing natural language description of the required instances. Therefore, the present invention offers an easy and automatic way for users to query data.

Although the preferred embodiment of the present invention has been described with a hardware structure or process steps, the system operation method according to the present invention can also be implemented as a computer program software. For example, the method according to an exemplary embodiment of the present invention can be embodied as a computer program product which can enable a computer to execute one or more exemplary methods. The computer program product may include a computer readable medium, on which computer program logic or codes are contained, for enabling the system to run according to one or more exemplary methods.

The computer readable storage medium can be an built-in medium installed in a computer body or a removable medium that is configured to be detachable from a computer body. The examples of the built-in medium includes but is not limited to a rewritable nonvolatile memory such as RAM, ROM, flash memory and hard disk. The examples of the removable medium can include but is not limited to an optical storage media such as a CD-ROM and DVD, a magnetic optical storage media such as an MO, magnetic storage media such as a flexible disk, tape and removable hard disk, media with a built-in rewritable nonvolatile memory such as a memory card, and media with a built-in ROM such as an ROM box.

The program of the method according to the present invention can be provided in the form of an externally provided broadcast signal and/or a computer data signal contained in a carrier. The computer data signal embodied as one or more instructions or functions of the exemplary method can be carried on a carrier for transmitting and/or receiving by an entity executing the instructions or functions of the exemplary method. Moreover, this kind of program can be easily stored and distributed when recorded on the computer readable storage media.

The above description of the present invention is only illustrative in essence. The modification without departing from the gist of the present invention should be construed within the scope of the present invention. Such modifications are not taken as departure from the spirit and scope of the present invention.

The invention claimed is:

1. A computing system for creating new concepts in existing ontologies based on new concept descriptions expressed in a natural language format, wherein words in a natural language are transformed into a certain language for expressing the new concepts in the existing ontologies, the computing system comprising a processor coupled to a memory and operative to implement:

a normalizer for receiving and parsing the new concept descriptions so as to transform them into normalized ones and output them, wherein said normalized concept description includes one or more description part(s) having kernel concepts, said descriptions parts can only contain the terms which can be identified in said existing ontology, and each of said kernel concept contains a headword and a zero or more property(s); and a new concept factory for, based on the normalized description of the new concept, identifying the kernel concepts in each normalized concept description part, and extracting the identified kernel concepts, related properties, and the relations among the kernel concepts for a user to create new concepts according to existing ontologies;

wherein the new concept factory comprises a kernel concept identifier for receiving the normalized new concept description, identifying the kernel concepts in each normalized concept description part, and extracting the identified kernel concepts, the related properties, and the relations among the kernel concepts;

wherein an existing ontology is viewed as a directed graph G, where concepts are nodes and a relationship between two concepts is a directed edge; given n concepts, let $c_i$ denote the i-th concept, and let $d(c_i, c_j)$ be the distance between the i-th concept $c_i$ and the j-th concept $c_j$ in the directed graph G, $s(node_i)$ be the total number of related concepts that the i-th concept $c_i$ can reach in the directed graph G, $s(c_i)$ be the number of concepts the concept $c_i$ can reach in the description part and $$\sum_{j=1}^{n, j \neq i} d(c_i, c_j)$$

be the sum of distances between the concept $c_i$ and all other concepts in the concept description, the importance $D_i$ of the concept $c_i$ can be calculated by the kernel concept identifier according to the following formula;

$$D_i \stackrel{def}{=} \frac{s(c_i)}{\sum_{j=1}^{n, j \neq i} d(c_i, c_j)}$$

and the kernel concept $c_k$ in the description is thus obtained, wherein k can be determined by the following formula:

$(1 \leq k \leq n) \hat{} (D_k = Max(D_{i|j=1,n}))$.

2. The system for creating new concepts in existing ontologies according to claim 1, wherein in the case that there are many description parts, the relation among the description parts is one of AND/OR/NOT.

3. The system for creating new concepts in existing ontologies according to claim 2, wherein the normalizer comprises:

a normalized description identifier for identifying whether a received new concept description is a normalized concept description and directly outputting the concept description identified as a normalized one; and a description normalizer connected with the normalized description identifier, for parsing the concept description which is identified as an un-normalized concept description by the normalized description identifier, transforming the un-normalized concept description into a normalized one, and then outputting the transformed normalized concept description.

4. The system for creating new concepts in existing ontologies according to claim 3, wherein the description normalizer comprises:
   a concept description partitioner for segmenting the received un-normalized concept description into description parts;
   a concept identifier connected with the concept description partitioner for identifying, for each segmented description part, kernel concepts in it; and
   a concept replacer connected with said concept identifier for, if the identified kernel concepts are not in a normalized format, replacing them with their corresponding normalized ones in the existing ontologies, wherein the replacement is executed based on a domain synonym set and sentence similarity algorithm.

5. The system for creating new concepts in existing ontologies according to claim 1 wherein the kernel concept identifier identifies headwords in each normalized concept description part by using headword identifying methods used in the field of natural language processing area.

6. The system for creating new concepts in existing ontologies according to claim 1, further comprising a new concept expression generator for imposing property restrictions on the kernel concepts identified by the kernel concept identifier and/or performing intersection/union/complement operations on them, so as to generate a new concept expression.

7. The system for creating new concepts in existing ontologies according to claim 6, wherein the new concept expression generator comprises:
   a shortest path generator for, if the description parts in a new concept description are $Part_1, \ldots, Part_n$ ($N>=1$), the headword in each description part are $H_1, \ldots, H_n$, the concepts and properties in each description part $Part_i$ are $C_{i1}, \ldots, C_{im}$ and $Pro_{i1}, \ldots, Pro_{iw}$, where $n>=1$, $m>=0$, and $w>=0$, and $m>=0$ means no other concept, and $w=0$ means no property in a corresponding part, then for each $C_{ij}$ where $1<=j<=m$, finding the shortest path $Path_{ij}$ from $H_i$ to $C_{ij}$, wherein the path should satisfy the following requirements:
   a) if $w>0$, it contains some $Pro_{it}$ where $1<=t<=w$,
   b) it contains no cycle,
   c) for any node $N_i$ in the path, if $N_i$ is a class, it is followed by edge $E_j$; if $E_j$ is a property, the destination must be a class or an instance; and if $E_j$ is a superClassOf relation, the destination must be a class;
   a language expression generator for generating a corresponding expression $E_{ij}$ in the certain language by using $Path_{ij}$ generated by the shortest path generator; and
   a combined expression generator for combining all expressions $E_{ij}$ in each $Part_i$ generated in the language expression generator with corresponding relationships to one combined expression $CE_i$ based on relations of AND/OR/NOT among $C_{ij}$, where j is from 1 to m.

8. The system for creating new concepts in existing ontologies according to claim 7, wherein the certain language is OWL (web ontology language).

9. The system for creating new concepts in existing ontologies according to claim 7, wherein the certain language is Description Logic.

10. The system for creating new concepts in existing ontologies according to claim 7, wherein the combined expression generator judges whether the number of the description parts is greater than 1, and if the number of the description parts is greater than 1, then based on relations among $Part_i$, combines the expression $CE_i$ and generates a final concept expression, and if the number of the description parts is equal to 1, then takes $CE_i$ as the final concept expression.

11. The system for creating new concepts in existing ontologies according to claim 1, further comprising a new concept validator for validating whether the generated new concept is what is actually required, and when the new concept is not the required one, modifying the generated new concept.

12. A method, performed on a computing system, for creating new concepts in existing ontologies based on new concept descriptions expressed in a natural language format, wherein words in a natural language are transformed into a certain language for expressing the new concepts in the existing ontologies, the method comprising the steps of:
   identifying whether the received new concept description has a normalized format, and if the received new concept description does not have a normalized format, transforming the new concept description of the un-normalized format into a normalized description, wherein said normalized concept description includes one or more description part(s) having kernel concepts, said description parts can only contain the terms which can be identified in said existing ontology, and each said kernel concept contains a headword and zero or more property(s); and
   identifying the kernel concepts in each normalized concept description part, and extracting the identified kernel concepts, related properties, and the relations among the kernel concepts, thereby generating an expression of the new concept based on existing ontologies;
   wherein the computing system comprises a processor coupled to a memory; and
   wherein if an ontology is viewed as a directed graph G, where concepts are nodes and a relationship between two concepts is a directed edge; given n concepts, let $c_i$ denote the i-th concept, and let $d(c_i, c_j)$ be the distance between the i-th concept $c_i$ and the j-th concept $c_j$ in the directed graph G, $s(node_i)$ be the total number of the related concepts that the i-th concept $c_i$ can reach in the directed graph G, then the step of identifying the headword in each normalized concept description part comprises the substeps of:
   for each concept ci in the description, computing $s(c_i)$ the number of the concepts the concept ci can reach in the description part, and $$\sum_{j=1}^{n, j \neq i} d(c_i, c_j),$$

the sum of distances between the concept $c_i$ and all other concepts in the concept description;
   computing the importance $D_i$ of the concept $c_i$ by using $s(c_i)$, the number of the concepts in the description part, and $$\sum_{j=1}^{n, j \neq i} d(c_i, c_j),$$

the sum of the distances between the concept $c_i$ and all other concepts in the concept description:

$$D_i \stackrel{def}{=} \frac{s(c_i)}{\sum_{j=1}^{n, j \neq i} d(c_i, c_j)};$$

identifying the kernel concept $c_k$ in the description by using the importance $D_i$ of the concept $c_i$ wherein k is determined by the following formula:

$$(1 \leq k \leq n)\hat{} (D_k = \text{Max}(D_{i|j=1,n})).$$

13. The method for creating new concepts in existing ontologies according to claim 12, wherein in the case that there are many description parts, the relation among the description parts is one of AND/OR/NOT.

14. The method for creating new concepts in existing ontologies according to claim 13, wherein the step of transforming the new concept description in an un-normalized format into a normalized description comprises the substeps of:

segmenting the received un-normalized concept description into description parts;

for each segmented description part, identifying its kernel concepts; and if the identified kernel concepts are not in a normalized format, then based on a domain synonym set and sentence similarity algorithm, replacing them with their corresponding normalized ones in the existing ontologies.

15. The method for creating new concepts in existing ontologies according to claim 12, the headwords in each normalized concept description parts are identified by using headword identifying methods used in the field of natural language processing area.

16. The method for creating new concepts in existing ontologies according to claim 12, wherein the step of generating a new concept expression comprises the substeps of imposing property restrictions on the kernel concepts identified by the kernel concept identifier and/or performing intersection/union/complement operations on them.

17. The method for creating new concepts in existing ontologies according to claim 16, wherein if the description parts in a new concept description are $Part_1, \ldots, Part_n$ (n>=1); the headwords in each description part are $H_1, \ldots, H_n$; the concepts and properties in each description part $Part_i$ are $C_{i1} \ldots, C_{im}$ and $Pro_{i1}, \ldots, Pro_{iw}$, respectively, where N>=1, M>=0, and w>=0 and m=0 means no other concept, and w=0 means no property in a corresponding part, then the step of creating the new concept expression comprises the subsets of:

1) for each $C_{ij}$ where 1<=j<=m, finding the shortest path $Path_{ij}$ from $H_i$ to $C_{ij}$, wherein the path should satisfy the following requirements:
      a) if x>0, it contains some $Pro_{it}$ where 1<=t<=w
      b) it contains no cycle,
      c) for any node $N_i$ in the path, if $N_i$ is a class, it is followed by edge $E_j$; if $E_j$ is a property, the destination must be a class or an instance; and if $E_j$ is a superClassOf relation, the destination must be a class;

2) generating a corresponding expression $E_{ij}$ in the certain language by using the shortest path $Path_{ij}$ from $H_i$ to $C_{ij}$; and 3) combining all expressions $E_{ij}$ in each $Part_i$ with corresponding relationships to one combination expression $CE_i$ based on relation of AND/OR/NOT among $C_{ij}$, where j is from 1 to m.

18. The method for creating new concepts in existing ontologies according to claim 17, wherein the certain language is OWL (web ontology language).

19. The method for creating new concepts in existing ontologies according to claim 17, wherein the certain language is Description Logic.

20. The method for creating new concepts in existing ontologies according to claim 17, wherein said step 3) comprises the substeps of:

judging whether the number of the description parts is greater than 1; and if the number of the description parts is greater than 1, then based on a relation AND/OR/NOT among $Part_i$, combining the combination expression $CE_i$ and generating a final concept expression, and if the number of the description parts is equal to 1, then taking the $CE_i$ as the final concept expression.

21. The method for creating new concepts in existing ontologies according to claim 12, further comprising the step of:

validating the generated new concept, and modifying the generated new concept based on the validating result.

22. The method for creating new concepts in existing ontologies according to claim 12, further comprising the step of:

creating a new concept by using the formalized expression of the normalized new concept and corresponding kernel concepts based on existing ontologies.

* * * * *